United States Patent [19]
Hettiger

[11] 4,295,163
[45] Oct. 13, 1981

[54] KEYING SIGNAL GENERATOR RESPONSIVE TO PLURAL INPUT SIGNALS

[75] Inventor: James Hettiger, Indianapolis, Ind.

[73] Assignee: RCA Corporation, New York, N.Y.

[21] Appl. No.: 165,933

[22] Filed: Jul. 2, 1980

[51] Int. Cl.³ .................. H04N 3/24; H04N 5/18; H04N 9/46; H04N 9/535
[52] U.S. Cl. .................. 358/165; 358/168; 358/20; 358/33; 358/34; 358/86
[58] Field of Search .................. 358/19, 20, 39, 21, 358/27, 28, 34, 33, 86, 153, 168, 160, 172, 198

[56] References Cited
U.S. PATENT DOCUMENTS

4,197,557  4/1980  Tuma et al. .................. 358/168

Primary Examiner—John C. Martin
Attorney, Agent, or Firm—Eugene M. Whitacre; William H. Meagher; Ronald H. Kurdyla

[57] ABSTRACT

A television receiver including a video signal sync separator and keyed signal processing circuits responsive to keying signals supplied by a keying signal generator is disclosed. The output of the sync separator is filtered to develop a bias voltage with a magnitude in accordance with the average output level of the sync separator. The keying signal generator provides periodically timed output keying signals in response to locally generated periodic horizontal flyback signals. The operation of the keying signal generator is enabled or disabled in response to the magnitude of the bias voltage derived from the sync separator output.

10 Claims, 5 Drawing Figures

KEYING SIGNAL GENERATOR RESPONSIVE TO PLURAL INPUT SIGNALS

This invention relates to a keying signal generator circuit used in a television receiver including keyed television signal processing circuits. In particular, the invention concerns an arrangement of such circuits to facilitate the use of a standard television receiver in a normal video mode when conventional video broadcast information is to be reproduced, and in an audio mode when the receiver is intended to reproduce audio information exclusive of video information.

In a color television receiver for processing a composite color television signal including luminance, chrominance and synchronizing (sync) signal components, there is a need for signal processing functions that require keying or synchronization with respect to the composite television signal. These functions include, for example, keying to separate the burst and chrominance information components of the composite signal, keying a blanking level clamp during image blanking intervals to establish a black reference level for a displayed picture, and keying during horizontal and vertical retrace blanking intervals to inhibit image display during these intervals. Accordingly, the receiver requires a source of keying signals to accomplish these functions.

Television receivers intended for institutional use in the rooms of multiple room facilities such as hotels, motels, and hospitals are often modified so that the occupants of individual rooms have the option of operating the receiver normally to receive conventional broadcast programming material including video and audio information, or operating the receiver in an audio mode so that only certain audio program material (e.g., background music) is reproduced to the exclusion of video information. In the audio mode, the kinescope screen is darkened or blanked and the television receiver operation resembles that of a radio receiver when the television receiver channel selector is set to a channel designated for use in the audio mode.

It is herein considered advantageous to provide an arrangement including a source of keying signals and keyed circuits in a conventional television receiver intended both for normal and institutional use, to facilitate use of the receiver in the audio mode without requiring that the receiver be modified in order to render the receiver capable of operating in both the normal and audio modes. In particular, in accordance with the present invention the keying arrangement disclosed herein is substantially noise immune and provides normal image display when the receiver processes a standard broadcast television signal including an RF picture carrier modulated with video information in the normal operating mode, but automatically blanks the kinescope display when the receiver processes a signal including an RF picture carrier without video information in the audio operating mode, without requiring modification of the receiver to accomplish the latter result. In addition, the disclosed keying arrangement enables the kinescope to produce a light output (i.e., the kinescope is not blanked) when the receiver, operating in the normal mode, is tuned to a vacant channel for example, in which case the receiver does not receive an RF picture carrier signal for processing.

Keying apparatus according to the present invention is included in a television receiver for processing a composite television signal comprising an image component, and a horizontal image sync component occurring during periodic horizontal image blanking intervals. The receiver also includes a sync separator network, a source of timing signals coincident with the horizontal blanking intervals, and keyed signal processing circuits.

The keying apparatus comprises a switching network responsive to the timing signals for providing an output keying signal during the horizontal blanking intervals. The keying signal is coupled to the keyed signal processing circuits. Also included is a network coupled to the sync separator for developing a bias voltage with a magnitude in accordance with the average output level of the sync separator. The bias voltage is coupled to a control input of the switching network so that the switching network responds to the bias voltage and to the timing signals.

In accordance with a feature of the invention, the bias voltage exhibits a first magnitude such that operation of the switching network is enabled, when television signals processed by the receiver include a radio frequency picture carrier signal modulated with image information and accompanying synchronizing information. The bias voltage exhibits a second magnitude such that operation of the switching network is inhibited, when signals processed by the receiver include a radio frequency picture carrier signal devoid of modulation. The bias voltage exhibits a third magnitude that is intermediate to the first and second magnitudes and insufficient to inhibit the switching network, when signals processed by the receiver are devoid of radio frequency picture carrier signals.

Figure 1:
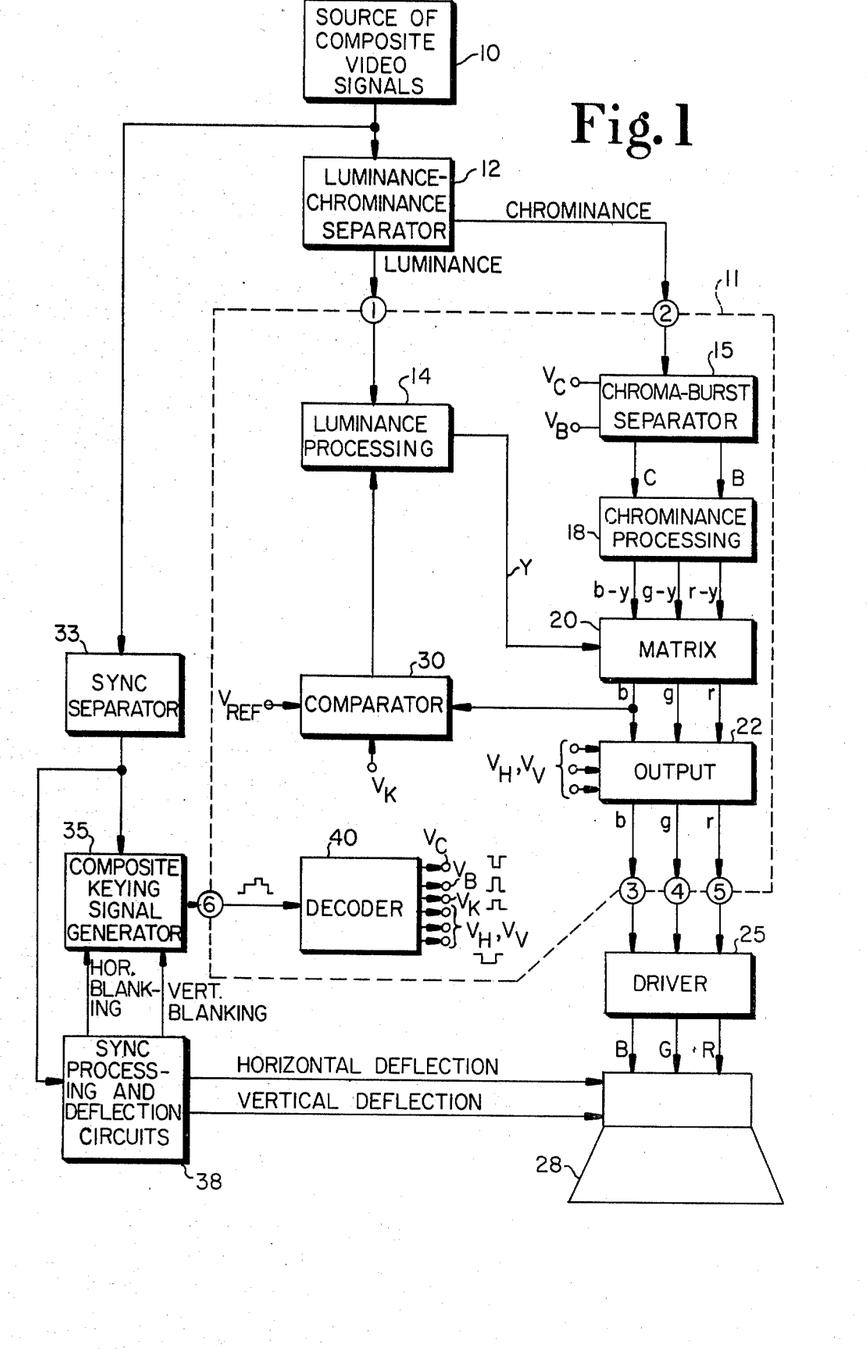
FIG. 1 shows a block diagram of a system including a color television receiver comprising apparatus according to the present invention.

In FIG. 1, a source of composite color television signals 10 (e.g., including RF and IF tuning and amplifier stages as well as video detector stages of a color television receiver) supplies signals to a luminance-chrominance signal separator 12. In a normal operating mode of the receiver, the signals from source 10 comprise video, audio, and video sync information. Separator 12 (e.g., a comb filter) separates the luminance and chrominance components of the composite television signal, and supplies these separated components to respective input terminals 1 and 2 of a luminance and chrominance signal processing network 11.

The separated luminance component is processed by a luminance signal processing unit 14 in a luminance channel of the receiver, including signal amplification and peaking stages for example. The separated chrominance component is supplied to a keyed chrominance-burst separator 15, which provides separated burst information (B) and chrominance picture interval information (C). Signal separator 15 can be of the type described in U.S. Pat. No. 4,038,681 of L. A. Harwood. The separated signals are then supplied to a chrominance signal processing unit 18 for developing r-y, g-y and b-y color difference signals as known. The color difference signals from unit 18 are combined with an amplified luminance output signal (Y) from unit 14 in a signal matrix 20, for developing output r, b and g color image signals.

The luminance channel also includes a blanking level clamp comprising a keyed comparator 30 which is keyed during the burst interval of each video signal horizontal blanking interval. When keyed, comparator 30 samples and compares a brightness reference voltage $V_{REF}$ with the D.C. level of the signal then appearing at the b (blue) signal output of matrix 20. An output signal from comparator 30 is supplied to a control input of luminance processor 14, for establishing the blanking level of the luminance signal (and thereby picture brightness) at a correct level in accordance with the level of voltage $V_{REF}$. The arrangement of comparator 30 with luminance processor 14 and matrix 20 is described in detail in U.S. Pat. No. 4,197,557 of A. V. Tuma, et al.

The r, g, b color signals from matrix 20 are separately coupled via plural output networks included in an output unit 22, to output terminals 3, 4 and 5 of network 11. The color signals are amplified individually by amplifiers within a kinescope driver stage 25 to provide high level output color signals R, G and B to respective intensity control electrodes of a color image reproducing kinescope 28.

Signals from source 10 are also supplied to a sync separator 33 for deriving the horizontal line synchronizing (sync) component of the television signal. The derived sync component is supplied from an output of sync separator 33 to sync processing and deflection circuits 38. Circuits 38 (e.g., including free-running, synchronized horizontal and vertical oscillators) provide horizontal and vertical deflection signals for application to deflection control circuits of receiver kinescope 28, and vertical and horizontal (flyback) blanking signals.

A composite keying signal generator 35 responds to output signals from sync separator 33, and to horizontal and vertical retrace blanking signals from deflection circuits 38. In the normal receiver operating mode, a composite ("sandcastle") keying signal output from generator 35 is supplied via a terminal 6 to a signal decoder 40, which decodes the composite keying signal into keying pulses $V_B$, $V_C$, $V_K$ and $V_H$, $V_V$ as required by keyed signal processing circuits within network 11. Decoder 40 is shown in detail in a copending U.S. patent application Ser. No. 113,371 of R. L. Shanley, II, et al. entitled "Controlled Output Composite Keying Signal Generator For A Television Receiver."

Keying pulses $V_B$ and $V_C$ encompass the burst interval and exhibit a mutually antiphase (push-pull) relationship, and are applied to keying inputs of chromaburst separator 15. Keying pulse $V_K$ is in-phase with and of the same (positive) polarity as pulse $V_B$, and is applied to a keying input of comparator 30. Plural keying pulses $V_H$, $V_V$ occur during each horizontal and vertical image retrace interval, and are applied to respective plural keying inputs of output stage 25.

In the arrangement of FIG. 1, the blocks within network 11 are largely capable of being fabricated as a single integrated circuit. In such case, terminals 1-6 correspond to external connecting terminals of the integrated circuit.

Figure 2:
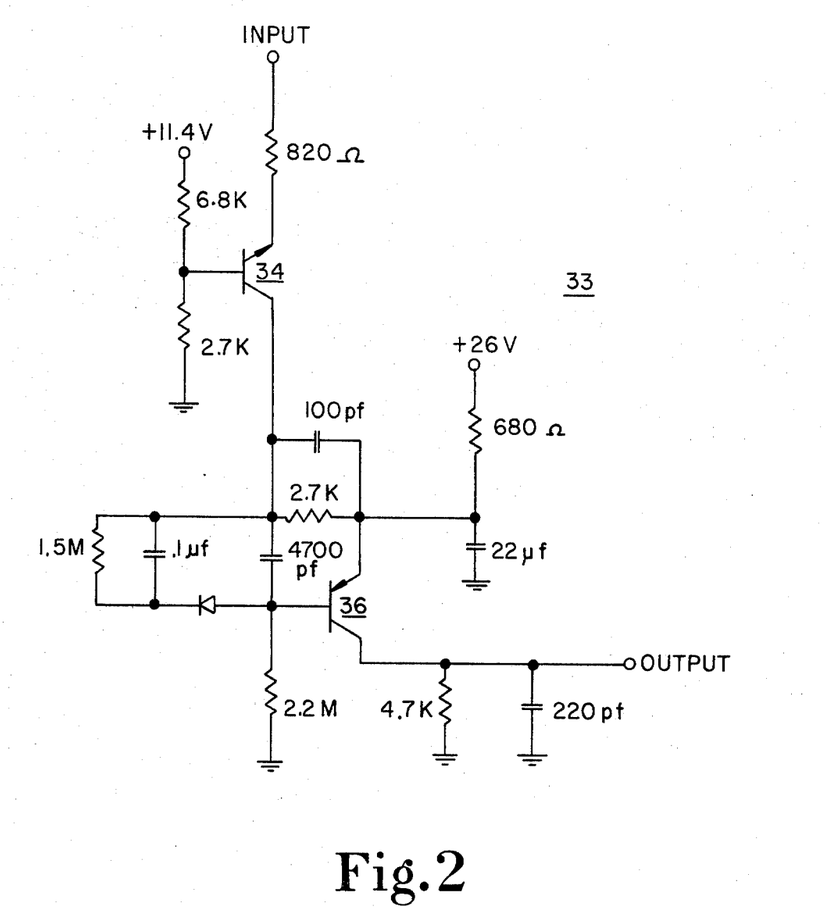
FIGS. 2–4 illustrate circuit diagrams of portions of the receiver shown in FIG. 1.

FIG. 2 shows a circuit arrangement of sync separator 33 in FIG. 1. Input signals from source 10 (FIG. 1) are applied to the emitter circuit of a transistor 34. The output of sync separator 33 is provided from the collector circuit of a transistor 36.

Normally expected sync pulses are produced at the output of the sync separator when the receiver processes a standard broadcast television signal including an RF carrier modulated with video information, in the normal operating mode. In this instance video detector and automatic gain control (AGC) stages included in source 10 (FIG. 1) operate so that the video detector output represents modulation information derived from the television signal, with very little or no spurious signals such as noise being present under typical normal reception conditions. However, when the receiver operates in the normal mode but is tuned to a vacant (locally unused) channel, the receiver does not receive an RF carrier signal for processing. In this instance, the AGC stage in source 10 of FIG. 1 significantly increases the gain of signal amplifier circuits in source 10 in an attempt to compensate for what is sensed as a very weak input signal. This action causes significant amplification of low level spurious signals such as noise that would otherwise not be amplified to significant levels. As a result, sync separator 33 is caused to produce spurious output signals in response to the amplified spurious signals.

Figure 3:
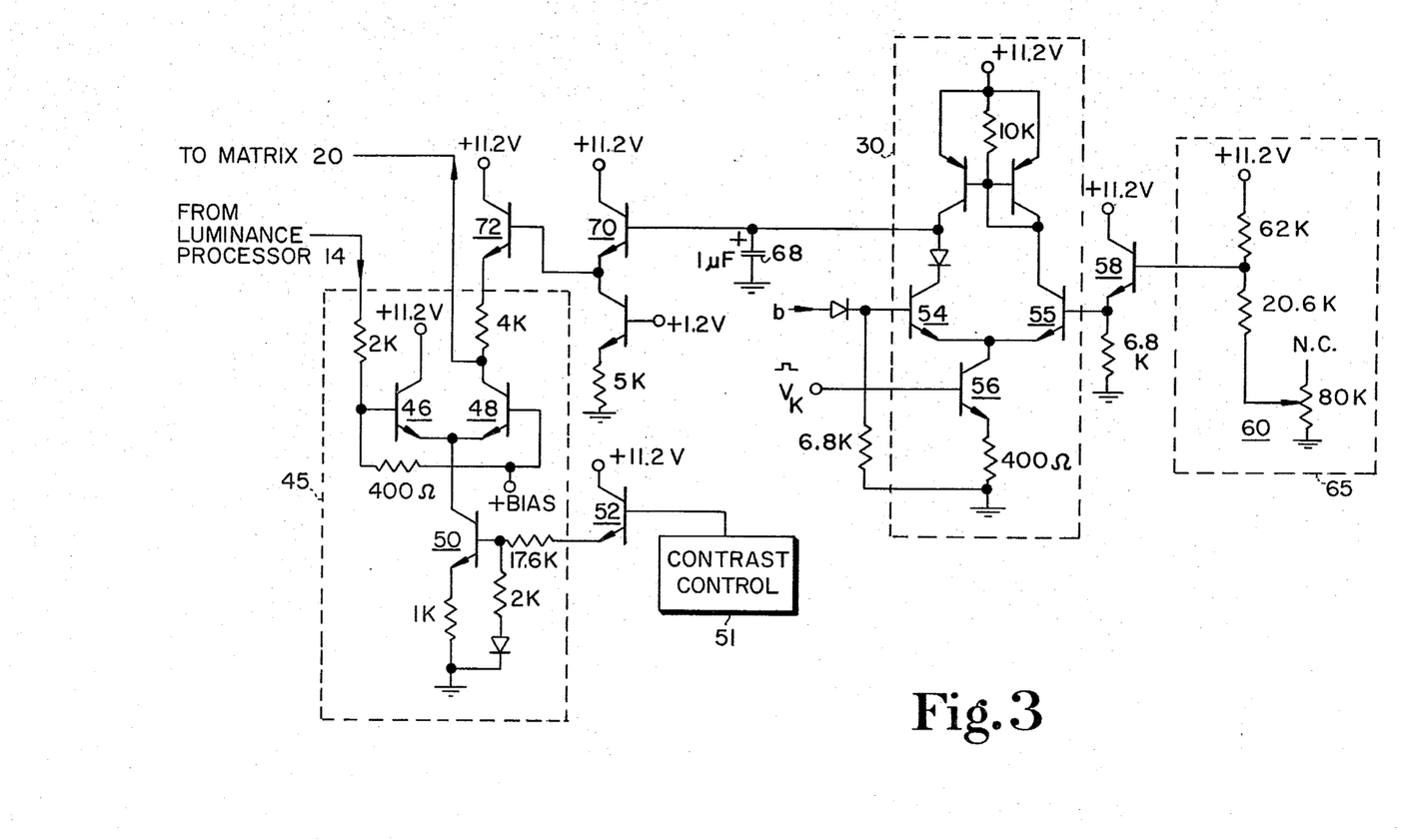

FIG. 3 is a circuit diagram illustrating the arrangement of comparator 30 (FIG. 1) and associated networks in greater detail.

A luminance amplifier 45 included in processor 14 (FIG. 1) comprises differentially connected transistors 46, 48 and an associated current source transistor 50. The gain of amplifier 45 and thereby the amplitude of signals processed by amplifier 45 is adjustable by means of a viewer adjustable contrast control network 51 (e.g., a potentiometer) coupled to current source transistor 50 via a transistor 52. Comparator 30 comprises differentially connected input transistors 54, 55 and an associated keyed current source transistor 56. Transistor 56 is keyed to conduct in response to positive keying pulses $V_K$ which occur during each horizontal blanking interval, and which are derived by decoder 40 (FIG. 1).

Signal b from matrix 20 is supplied to a video signal input of comparator 30 at the base input of transistor 54. A signal applied to the reference input of comparator 30, corresponding to the base input of transistor 55, is coupled via a follower transistor 58. This signal comprises a brightness reference voltage derived from the wiper of a viewer adjustable resistor 60 included in a network 65. An output signal from comparator 30 is derived from the collector circuit of transistor 54 (including a transistor active load circuit), and is developed on and stored by a filter capacitor 68. The level of voltage on capacitor 68 increases or decreases in accordance with the difference in magnitude between the input signals supplied to comparator transistors 54 and 55, when these transistors are rendered conductive as current source transistor 56 is keyed to conduct during the periodic blanking intervals.

The voltage on capacitor 68 is coupled via transistors 70 and 72 to the collector output circuit of transistor 48 in amplifier 45, for controlling the D.C. level of the luminance output signal of amplifier 45 in accordance with the control voltage on capacitor 68 as developed during the horizontal blanking intervals. The corresponding D.C. blanking levels of the r, g, b color signals from matrix 20 are modified accordingly. By closed loop control action, the control voltage developed on capacitor 68 in response to the operation of comparator 30 serves to vary the D.C. blanking level of the color signals in a direction to minimize the difference between the levels of the signals applied to comparator transistors 54 and 55, thereby effecting the desired control of the D.C. level of the signals ultimately supplied to the kinescope.

It is noted that with the arrangement of comparator 30 and storage capacitor 68, capacitor 68 will discharge via transistor 70 when the operation of comparator 30 is disabled due to the absence of keying signals $V_K$. In this event, the reduced charge on capacitor 68 is in a direction to modify the D.C. level of the luminance output signal from amplifier 45 towards black level. Accordingly, the kinescope display is dark (i.e., black) within a short time after normal keying of comparator 30 is interrupted.

Figure 4:
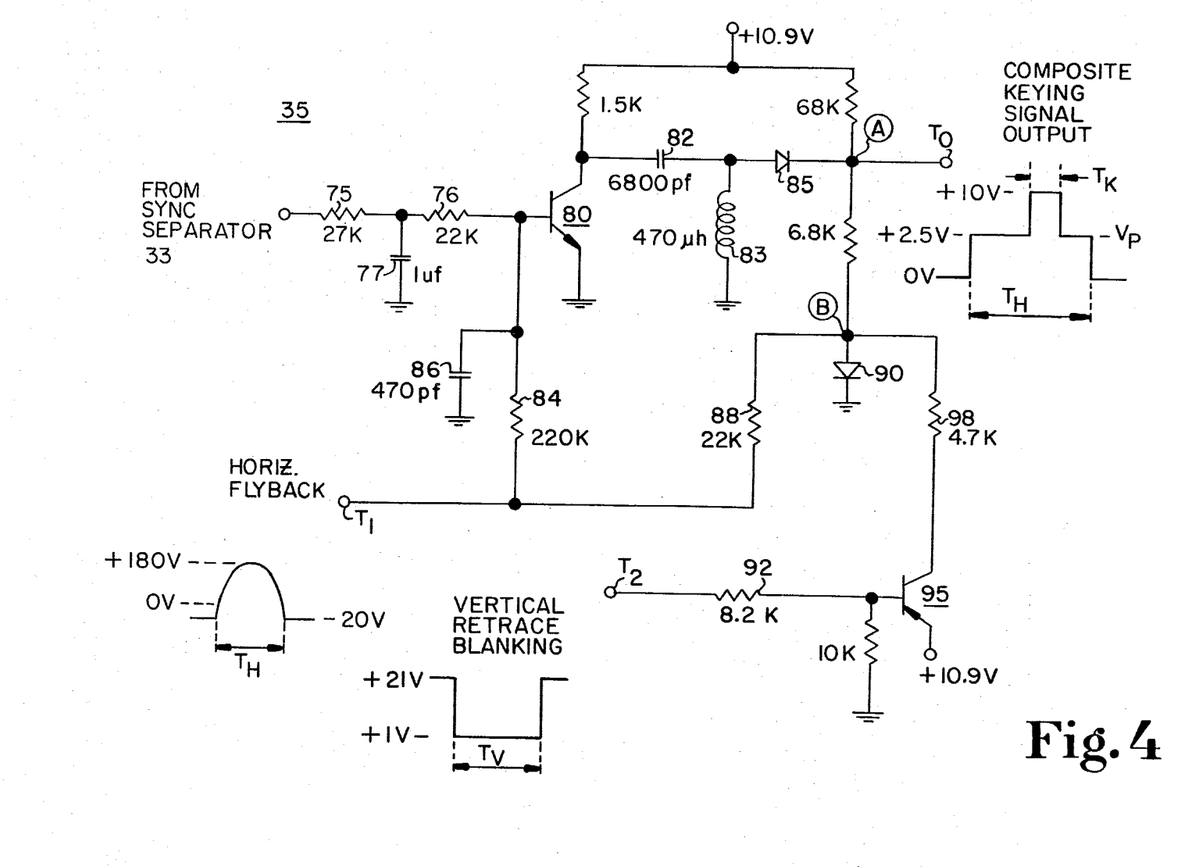

FIG. 4 shows a circuit arrangement of composite keying signal generator 35 in FIG. 1. In circuit 35, a base input of a normally nonconductive switching transistor 80 is coupled to the output of sync separator 33 via an average responding low pass filter circuit including resistors 75, 76 and a filter capacitor 77. A resonant circuit comprising a capacitor 82 and an inductor 83 is included in the collector output circuit of transistor 80. As disclosed in U.S. Pat. No. 4,051,518-Sendelweck, the resonant circuit is excited into ringing at its natural frequency when transistor 80 is keyed to conduct. The period of the ringing signal is determined by the values of capacitor 82 and inductor 83. A resulting output ringing signal in the collector circuit of transistor 80 coacts with the inverse conduction characteristic of transistor 80 to turn off transistor 80 prior to the completion of one full cycle of ringing, so that a positive burst gate pulse produced at the junction of capacitor 82 and inductor 83 corresponds to the first full half cycle (of positive polarity) of the ringing signal. The positive output pulse occurs over interval $T_K$ within horizontal retrace interval $T_H$, and encompasses the burst interval. A diode 85 couples the positive output pulse to a circuit point A.

Transistor 80 is keyed to conduct in response to positive polarity horizontal flyback pulses coupled via a terminal $T_1$ and a resistor 84, rather than in response to separated horizontal sync pulses from sync separator 33. A phase compensation capacitor 86 assists to determine the time at which transistor 80 conducts so that a properly timed gate pulse is developed at the junction of capacitor 82 and inductor 83 and at point A.

Positive horizontal flyback pulses are coupled to a point B via terminal $T_1$ and a resistor 88. Also coupled to point B is a clamping diode 90. Point B is clamped to the junction offset voltage of diode 90 (+0.7 volts) when diode 90 conducts during horizontal blanking interval $T_H$ in response to the flyback pulse. At the same time, a voltage of approximately +2.5 volts is developed at point A over horizontal blanking interval $T_H$.

A composite horizontal keying signal including first and second pulse components is produced at point A and at an output terminal $T_0$ as a result of the described circuit operation. During each horizontal blanking interval $T_H$, the first (lower) pulse component with a blanking pedestal level $V_p$ (+2.5 volts) is produced in response to the flyback pulse applied to point B. The burst gate output pulse provided by the conduction of transistor 80 comprises a second (upper) pulse component of the composite keying signal. The second pulse, occurring over interval $T_K$, is superimposed on the first pulse component. This second pulse is decoded by decoder 40 (FIG. 1) to provide the keying pulse $V_K$ employed to key comparator 30 (FIG. 1).

Analogous observations pertain with respect to generating a composite vertical blanking signal during vertical blanking interval $T_V$. During each vertical retrace blanking interval $T_V$, a negative-going vertical blanking pulse is coupled to point B via a terminal $T_2$, a resistor 92, a transistor 95 and a resistor 98. The vertical blanking pulse causes transistor 95 to conduct over interval $T_V$. Diode 90 is rendered conductive to clamp point B to +0.7 volts, and a voltage then developed at point A corresponds to the desired level of the lower pulse component for vertical blanking purposes. The waveforms of composite keying signals developed for both horizontal and vertical purposes are shown in detail in aforementioned U.S. patent application Ser. No. 113,371 of R. L. Shanley, II, et al.

In a normal operating mode of the receiver, normal video broadcast material is displayed in response to a received composite television signal including periodic horizontal line sync pulses. Separated sync pulses appear at the output of sync separator 33 with positive polarity and a peak level of approximately +20 volts. At this time the sync separator output includes A.C. and D.C. components such that the average voltage developed at the output of sync separator 33 is approximately +4.0 volts. The output from sync separator 33 is filtered by the network including resistors 75, 76 and capacitor 77 of circuit 35 to develop a positive D.C. bias voltage at the base of transistor 80. The level of this voltage is such that on-off keying of transistor 80 by the flyback pulses is permitted to proceed normally, whereby the composite keying signal is developed at terminal $T_0$ as discussed. In this regard it is noted that flyback keying of transistor 80 is desirable compared to sync keying since greater noise immunity results with flyback keying.

Keying signals generator 35 is advantageous when used in a television receiver employed in an institutional environment, where the receiver is intended to reproduce audio programming material alone in an audio operating mode, as well as normal video broadcast material in a normal mode. Additional details of such a dual operating mode receiver are found in copending application Ser. No. 165,411 J. E. Nicholson, et al., entitled "Institutional Audio-Visual System Including A Plural Operating Mode Television Receiver."

Figure 5:
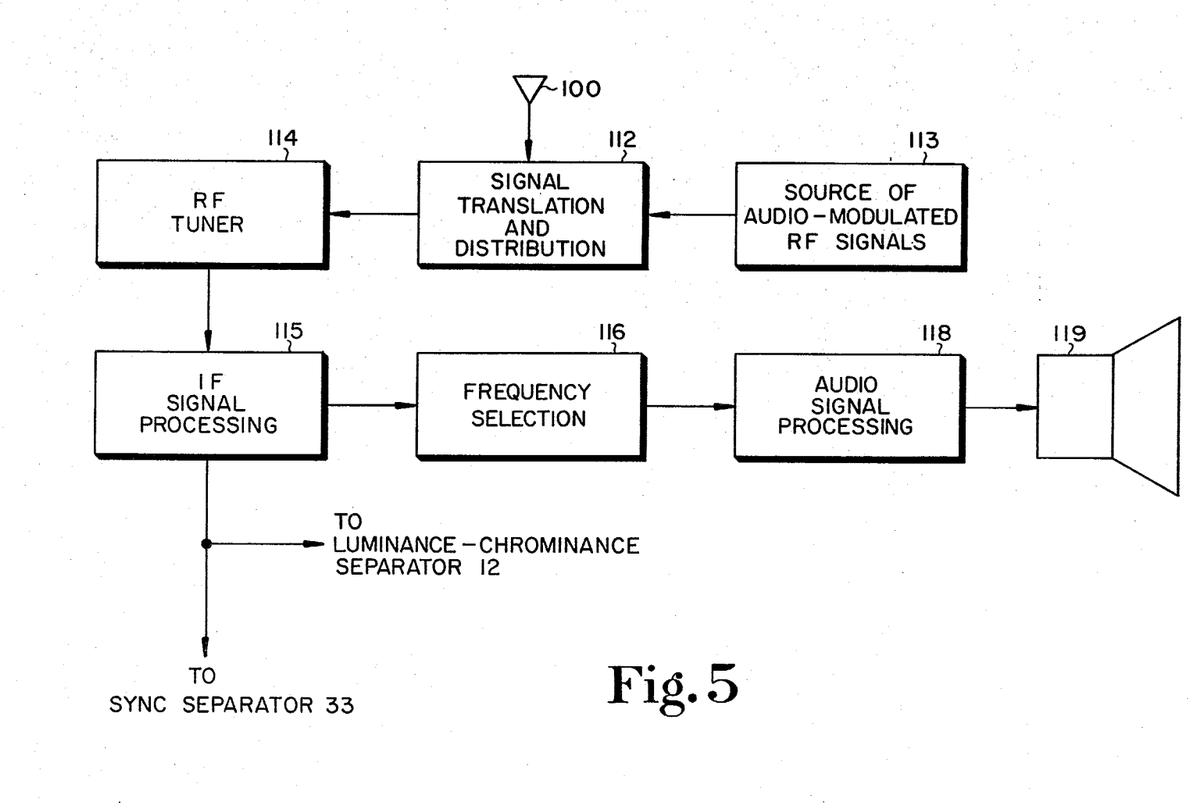
FIG. 5 depicts a television receiver as shown in FIG 1, in an institutional environment.

A receiver as shown in FIG. 1 can be employed in an institutional environment as indicated by the system shown in FIG. 5.

In the system of FIG. 5, standard broadcast composite television signals (i.e., including video, sound and video synchronizing information) are received by an antenna 100 and coupled to one input of a signal translation and distribution unit 112. Another input of unit 112 receives a locally generated auxiliary radio frequency (RF) signal from a source 113. The signal from source 113 comprises an unmodulated video RF carrier (i.e., without video and video synchronizing information) and a sound carrier frequency modulated with audio information, at the video and sound carrier frequencies of a locally unused broadcast channel designated for use in the audio mode of the receiver. Unit 112 combines the signals from antenna 100 and source 113 and provides signals suitable for application to antenna input terminals of the receiver. Unit 112 also includes television signal distribution amplifier networks for developing a high level output signal to facilitate supplying signals to a plurality of television receivers via appropriate signal distribution networks (not shown).

The signals from unit 112 are coupled via antenna input terminals of the receiver to an input of an RF tuner 114 including a frequency selective channel selector mechanism, and RF amplifier and mixer stages for providing an intermediate frequency (IF) output signal. The IF output signal from tuner 114 is processed by a unit 115 including IF signal processing and detector stages.

A first output of unit 114 at which IF signals appear is applied to a frequency selection network 116 for deriving the sound component of the television signal. The derived sound component is afterwards processed by audio signal processing circuits 118 for developing an audio output signal suitable for driving a loudspeaker 119.

A second output of unit 115 at which IF signals appear is applied to luminance-chrominance separator 12 (FIG. 1). The second output of IF unit 115 is also coupled to sync separator 33 (FIG. 1) for deriving the horizontal line synchronizing component of the television signal. With this system, antenna 100 and units 112, 113 are typically located external to the receiver.

When the channel selector of the receiver in FIG. 5 is set to a (locally vacant) channel designated for use in the audio mode, the receiver reproduces only the audio information as provided by signals from source 113. In this situation, sync separator 33 remains in a quiescent state due to the absence of horizontal sync components in the auxiliary signal, and the output of sync separator 33 exhibits a quiescent D.C. level of approximately +20 volts. This output level is filtered by network 75, 76, 77 to develop a D.C. bias voltage on the base of transistor 80 that is significantly more positive than the bias level developed under normal (video reception) conditions. This greater bias level is sufficient to maintain transistor 80 conductive in a saturated state for as long as this condition persists (i.e., for as long as the receiver is set to the designated audio mode channel). The base bias of transistor 80 is sufficiently positive so that the flyback pulses have no effect on the operation of transistor 80. Composite keying signal generator 35 therefore is not keyed to produce the upper keying pulse component of the composite keying output signal that otherwise would be developed during interval $T_K$ of each horizontal blanking interval $T_H$ in the normal video operating mode. Accordingly, the derived keying pulses $V_K$ employed to key comparator 30 in the normal video mode are absent. Comparator 30 therefore is disabled with the result that comparator storage capacitor 68 (FIG. 3) discharges a short time after keying of comparator 30 is disrupted, as noted earlier, and the viewing screen of the kinescope is caused to exhibit a uniformly dark level (i.e., the kinescope display is blanked).

Thus with the disclosed system including keying signal generator 35, the kinescope is blanked automatically when the receiver is set to operate in the audio mode. The receiver does not require an additional mechanical switch or equivalent mechanism to blank the kinescope when the channel selector is set to an audio mode channel, and it is not necessary to adjust mechanical cams or other devices in the receiver tuner assembly so that the switch is activated only when the audio mode channel is selected, as discussed in the aforementioned copending patent application of J. E. Nicholson, et al.

In this connection it is noted that the output of the sync separator is used to develop a bias voltage rather than a keying pulse for keying transistor 80 in FIG. 4, and the keying of transistor 80 is determined by the relatively noise-free, locally generated flyback pulses.

With this arrangement the kinescope display screen will remain uniformly dark in the audio mode since it is very unlikely that noise or other spurious signals will affect the operation of keyed transistor 80 so as to produce spurious output signals otherwise capable of causing spurious changes (e.g., brightening) of the dark display screen.

It is also noted that, in the normal receiver operating mode, horizontal sync information (as well as other picture information) is absent when the receiver is tuned to a vacant channel, for example. As explained earlier in connection with the sync separator shown in FIG. 2, under these conditions spurious signals including noise appear at the output of the sync separator. The output of the sync separator then exhibits an average D.C. level of approximately +10 volts. This output level is filtered by network 75, 76, 77 to develop a D.C. bias voltage on the base of transistor 80 that alone is insufficient to render transistor 80 conductive. However, this bias voltage is low enough to permit keying of transistor 80 between conductive and nonconductive states by the locally generated horizontal flyback pulses. Therefore, signal generator 35 continues to operate, and the screen is not blanked, so that the light output of the kinescope is modulated by the received spurious signals, producing an effect referred to as "snow" on the display screen. If the screen were kept dark (as in the audio mode) under these circumstances, a viewer might think that the receiver is operating improperly and in need of repair, based upon a viewer's typical expectations with regard to receiver operation under these circumstances. The described operation for vacant channel reception and under similar conditions therefore minimizes the likelihood that unnecessary receiver service calls will be made.

What is claimed is:

1. In a television receiver for processing a composite television signal comprising an image component and a horizontal image sync component occurring during periodic horizontal image blanking intervals, said receiver including means for deriving said sync component from said television signal; means for providing timing signals coincident with said horizontal blanking intervals; and keyed signal processing circuits; apparatus for generating a keying signal, comprising:

switching means responsive to said timing signals for providing an output keying signal during said horizontal blanking intervals;

means for coupling said output keying signal to said keyed signal processing circuits;

means coupled to said sync deriving means for developing a bias voltage with a magnitude in accordance with the average output level of said sync deriving means; and means for coupling said bias voltage to a control input of said switching means so that said switching means responds to said bias voltage and to said timing signals.

2. Apparatus according to claim 1, wherein:
   said timing signals comprise horizontal flyback blanking pulses.

3. Apparatus according to claims 1 or 2, wherein:
   said bias voltage exhibits a first magnitude when television signals processed by said receiver comprise a radio frequency picture carrier signal modulated with image information and accompanying synchronizing information, said bias voltage of said first magnitude being such that operation of said switching means is enabled;

said bias voltage exhibits a second magnitude when signals processed by said receiver comprise a radio frequency picture carrier signal devoid of modulation, said bias voltage of said second magnitude being such that operation of said switching means is inhibited; and said bias voltage exhibits a third magnitude, intermediate to said first and second magnitudes, when signals processed by said receiver are devoid of radio frequency picture carrier signals, said bias voltage of said third magnitude being insufficient to inhibit said switching means.

4. Apparatus according to claims 1, 2 or 3, wherein:
said means for providing said bias voltage comprises a low pass filter coupled to the output of said sync deriving means.

5. In a television receiver for processing a composite television signal containing an image component and a horizontal image sync component occurring during periodic horizontal image blanking intervals, said receiver including means for separating said sync component from said television signal; means for providing timing signals coincident with horizontal blanking intervals; and keyed signal processing circuits; apparatus including means for generating a composite keying signal comprising a first pulse substantially coincident with said blanking interval and a second pulse superimposed on said first pulse within a portion of said blanking interval, said apparatus comprising:

signal translating means responsive to said timing signals for producing said first pulse;

keyed means responsive to said timing signals for producing a pulse occupying a portion of said blanking interval and corresponding to said second pulse;

means for combining said first and second pulses to produce said composite keying signal;

means for coupling said composite keying signal to said keyed signal processing circuits;

means coupled to said sync separating means for developing a bias voltage with a magnitude in accordance with the average output level of said sync separating means; and means for coupling said bias voltage to a control input of said keyed means so that said keyed means responds to said bias voltage and to said timing signals.

6. Apparatus according to claim 5, wherein:
said timing signal corresponds to a horizontal flyback signal generated locally by said receiver.

7. Apparatus according to claims 5 or 6, wherein:
said bias voltage exhibits a first magnitude when television signals processed by said receiver comprise a radio frequency picture carrier signal modulated with image information and accompanying synchronizing information, said bias voltage of said first magnitude being such that operation of said keyed means is enabled;

said bias voltage exhibits a second magnitude when signals processed by said receiver comprise a radio frequency picture carrier signal devoid of modulation, said bias voltage of said second magnitude being such that operation of said keyed means is inhibited; and said bias voltage exhibits a third magnitude, intermediate to said first and second magnitudes, when signals processed by said receiver are devoid of radio frequency picture carrier signals, said bias voltage of said third magnitude being insufficient to inhibit said keyed means.

8. In a television receiver including a video signal channel for processing an image representative video signal having periodically recurring image intervals, and image blanking intervals disposed between adjacent image intervals and containing a horizontal image sync component and a blanking level determinative of image brightness, apparatus comprising:

means for deriving said sync component from said video signal;

a source of timing signals coincident with said horizontal blanking intervals;

a source of reference signal representative of a desired level of image brightness;

keyed control means operative during said blanking intervals in response to keying signals for comparing said reference signal and said blanking level during said blanking intervals to provide an output control signal indicative of the difference between said reference signal and said blanking level;

means for coupling said control signal to said video channel, for varying said blanking level in a direction to reduce said difference to a minimum; and means for providing said keying signals, comprising switching means responsive to said timing signals for generating said keying signal at an output during said blanking intervals;

means coupled to said sync deriving means for developing a D.C. bias voltage with a magnitude in accordance with the average output level of said sync deriving means; and means for coupling said bias voltage to a control input of said switching means so that said switching means responds to said bias voltage and to said timing signals.

9. An institutional television system including a television receiver and a source of a plurality of modulated RF carrier signals occupying respectively different spectrum channels, with at least one of said channels occupied by modulated RF carrier signals of a first type conveying television picture information with accompanying sound information and inclusive of a picture carrier modulated by composite video signals inclusive of a video sync component, and another of said channels occupied by modulated RF carrier signals of a second type conveying sound information to the exclusion of television picture information and inclusive of a picture carrier devoid of video signal modulation; said television receiver including:

adjustable input means, coupled to said source, for selectably rendering said television receiver responsive to a selected one of a plurality of different spectrum channels inclusive of said occupied channels and additional unoccupied spectrum channels, and for developing a first output representative of the sound information conveyed by said selected channel, if any, and a second output representative of the video signal modulation, if any, of the picture carrier of said selected channel;

a sound reproducer;

means for rendering said sound reproducer responsive to said first output;

an image display device;

video signal processing means, including keyed circuits, similarly energized for each channel selection condition of said adjustable input means and having an input responsive to said second output of said adjustable input means and an output coupled to said image display device for controlling the light output thereof;

a sync separator with an input coupled to said second output of said adjustable input means and an output for providing a separated sync component when the selected channel is coupled by modulated RF carrier signals of said first type;

means for controlling the operation of said video signal processing means in accordance with the output of said sync separator such that (1) the light output of said image display device is controlled in accordance with said video signal modulation when the output of said sync separator indicates that the selected channel is occupied by modulated RF carrier signals of said first type, and (2) the light output of said image display device is inhibited when the output of said sync separator indicates that the selected channel is occupied by modulated RF carrier signals of said second type; said controlling means comprising switching means responsive to timing signals coincident with horizontal image blanking intervals of television signals of said first type, for providing an output keying signal during said horizontal blanking intervals;

means for coupling said output keying signal to said keyed signal processing circuits;

means coupled to said sync separator for developing a bias voltage with a magnitude in accordance with the average output level of said sync separator; and means for coupling said bias voltage to a control input of said switching means so that said switching means responds to said bias voltage and to said timing signals.

10. Apparatus according to claim 9, wherein:

said bias voltage exhibits a first magnitude when said television receiver is rendered responsive to an occupied spectrum channel including signals of said first type, said bias voltage of said first magnitude being such that operation of said switching means is enabled;

said bias voltage exhibits a second magnitude when said television receiver is rendered responsive to an occupied spectrum channel including signals of said second type, said bias voltage of said second magnitude being such that operation of said switching means is inhibited; and said bias voltage exhibits a third magnitude, intermediate to said first and second magnitudes, when said television receiver is rendered responsive to an unoccupied spectrum channel, said bias voltage of said third magnitude being insufficient to inhibit said switching means.

* * * * *